United States Patent [19]

Engels et al.

[11] Patent Number: 5,084,101
[45] Date of Patent: Jan. 28, 1992

[54] PROCESS FOR THE PREPARATION OF AN OPEN-PORE FOAM FROM ESSENTIALLY INORGANIC COMPONENTS

[75] Inventors: Hans W. Engels, Troisdorf; Karlheinz Neuschäffer, Leichlingen, both of Fed. Rep. of Germany

[73] Assignee: Huels Troisdorf AG, Troisdorf, Fed. Rep. of Germany

[21] Appl. No.: 574,584

[22] Filed: Aug. 29, 1990

[30] Foreign Application Priority Data

Sep. 12, 1989 [DE]  Fed. Rep. of Germany ........ 3930501

[51] Int. Cl.$^5$ ........................... C09D 4/00; C09L 1/24
[52] U.S. Cl. ...................... 106/624; 106/600; 106/605; 106/614; 106/646; 106/820; 106/821
[58] Field of Search ................ 106/4, 18.12, 38.3, 106/38.25, 601, 605, 645, 646, 802, 819, 820, 821, 600, 614, 624, 638, 820, 821; 252/62

[56] References Cited

U.S. PATENT DOCUMENTS

| | | | |
|---|---|---|---|
| 3,867,159 | 2/1975 | Ergene | 106/88 |
| 3,989,534 | 11/1976 | Plunguinn et al. | 106/88 |
| 4,036,656 | 7/1977 | Bucco et al. | 106/88 |
| 4,533,393 | 8/1985 | Neuschaeffer et al. | 106/18.12 |
| 4,681,631 | 7/1987 | Engels et al. | 106/4 |

*Primary Examiner*—William R. Dixon, Jr.
*Assistant Examiner*—M. Marcheschi
*Attorney, Agent, or Firm*—Felfe & Lynch

[57] ABSTRACT

A composition for the production of an open-pore foam product from essentially inorganic components contains, in addition to known components, a rock-forming solid substance, a curing agent, a foaming additive, and an at least partly alkali-soluble protein to produce open pores. The rock-forming component is a reactive solid substance selected from the group consisting of I finely dispersed oxide mixture containing amorphous silicon dioxide and aluminium oxide, II vitreous, amorphous electrofilter ash, III milled calcined bauxite, IV electrofilter ash from a brown coal power station, V undissolved amorphous silicon dioxide from an amorphous disperse powder-like, dehydrated or water-containing silicic acid or from high temperature processes (silica fume), VI metakaolin, and VII cement.

The curing agent is an alkali metal silicate solution containing 1.2 to 2.5 mols of silicon dixoide per mol of potassium oxide and/or sodium oxide.

7 Claims, No Drawings

1

PROCESS FOR THE PREPARATION OF AN OPEN-PORE FOAM FROM ESSENTIALLY INORGANIC COMPONENTS

FIELD OF THE INVENTION

This invention relates to a molding composition or to the combination of a plurality of components for the manufacture of a solid foam product comprising an inorganic, rock-forming component, a water-containing second component which initiates the curing reaction of the rock-forming component in the alkaline range, and a foam-forming component, to a process for the manufacture of an open-pore, solid foam product, and to the open-pore foam product produced by this process.

THE PRIOR ART

U.S. Pat. No. 4,533,393 discloses foam products having closed pores which are made from water-containing, curable inorganic molding compositions. Such compositions contain an alkali metal silicate solution, fillers, foaming agents and a solid substance which is capable of reacting with the alkali metal silicate solution. The solid substance is an amorphous, powder-like oxide mixture which contains amorphous silicon dioxide and aluminum oxide. It is formed, for example, in the form of furnace filter dust during the production of electrocorundum.

U.S. Pat. No. 4,681,631 discloses that other reactive solid substances include vitreous amorphous electrofilter ash containing, in addition to iron oxide, 45 to 60 wt.-% $SiO_2$-glass, 25 to 35 wt.-% $Al_2O_3$ and milled calcined bauxite, where the source of the electrofilter ash is a high temperature hard-coal power plant. Metakaolin may also be used as the reactive solid substance, according to French Patents 2,512,805 and 2,512,806, where the metakaolin may optionally be combined with Portland cement.

Published European Application No. 0 324 968 (WO 89/05783) discloses a molding composition for the manufacture of an inorganic, closed-pore foam product which foams and cures within a short period of time when certain accelerators are added. The inorganic rock-forming components of this composition are oxide mixtures containing amorphous silicon dioxide and aluminum oxide, vitreous amorphous electrofilter ash, calcined bauxite or undissolved amorphous silicon dioxide from an amorphous, disperse powder-like silicic acid. The curing agent is an aqueous solution of alkali metal silicates.

So far only a few solid substances which are capable of reacting with an alkali metal silicate solution have been found, the special reactivity of which triggers an active rock-forming reaction, for instance exothermically, and forms solid shaped bodies within a short period of time.

The foam products produced according to the prior art are closed-pore products and can therefore be used for heat insulation and heat protection, inter alia. However, certain fields of application, especially sound absorption, filters and the like require the use of open-pore foam products.

OBJECTS OF THE INVENTION

It is therefore an object of the present invention to provide a molding composition or combination of ingredients for the manufacture of open-pore foam products.

Other objects and advantages of this invention will become apparent as the description thereof proceeds.

DESCRIPTION OF THE INVENTION

The above object is achieved in accordance with the present invention by the use of at least partly alkali-soluble proteins or the metabolic products thereof in an amount sufficient to form an open-pored foam product.

The term "combination" as used within the context of the present invention means the sum of the not yet (completely) admixed components of the molding composition.

We have discovered that, starting from the same reactive solid substances, fillers and foaming agents described above, it is possible to produce an open-pore foam whose pore size, density and structure can be adjusted in dependency upon the amounts of reactants and protein containing additives, provided certain vegetable and animal products are added which exhibit a partial solubility of the protein in an alkaline medium. During foaming and curing, these at least partly alkali-soluble vegetable or animal products and the processed products thereof act as "pore openers" which interrupt the wall formation of the foam pores. Accordingly, gas-air- and liquid-permeable hard foams can be produced which are suitable for a great variety of applications. The foam with open pores has sound damping properties which depend upon the pore size and the density. It can be used as a filtering material or, because of its large surface, as a carrier of catalysts or other active substances. The pore size and the degree of porosity can be controlled so that foams can be produced through which water or the like can flow rapidly, or foams with a predetermined, controlled rate of passage for gas, air or liquid. At a low bulk density, the foams with open pores can be made to float on water by means of a conventional hydrophobic treatment, for example with silanes.

The preferred rock-forming component in accordance with the present invention is a reactive solid substance or a solid substance mixture selected from the group consisting of I finely dispersed oxide mixture containing amorphous silicon dioxide and aluminum oxide,
II vitreous, amorphous electrofilter ash,
III milled calcined bauxite,
IV electrofilter ash from brown coal power plants,
v undissolved amorphous silicon dioxide, especially that obtained from an amorphous, disperse powder-like, dehydrated or water-containing silicic acid or from high temperature processes (silica fume), and
VI metakaolin, where the reactive solid substance preferably cures in an exothermic, inorganic reaction with an alkali metal silicate solution containing 1.2 to 2.5 mols of silicon dioxide per mol of $K_2O$ and/or $Na_2O$ as a hardening agent.

We have surprisingly found that the effect of the at least partly alkali-soluble proteins as pore openers also occurs in the completely different reaction of cement with water or with an alkali metal silicate solution. In this manner it is thus possible to produce open-pore concrete.

The molding composition of the present invention preferably contains additional fillers like fly ash, expanded clay, perlite, mica, quartz powder, basalt powder, talcum, foam glass or the like, or mixtures thereof, preferably in amounts up to 75 wt.-%, especially 4 to 40 wt.-%, based on the total weight of the mixture, or up to 300 wt.-%, especially 5 to 100 parts by weight per 100 parts by weight of the rock-forming component.

The rock-forming component is preferably used in an amount of 0.4 to 4 parts by weight per part by weight of alkali metal silicate solution.

In accordance with the present invention, the naturally occurring animal or vegetable products responsible for the open-pore structure of the foam are those containing proteins which are partly soluble in an alkali, that is, wherein the protein is partially soluble in an alkali. are naturally occurring animal and vegetable products and/or modified or processed substances mechanically or chemically derived therefrom with contents of protein. Examples thereof are gluten, glutelin, soybean protein, casein, gelatin, albumin in pure form or as egg-white or as a processed product thereof, cereal flour or milled products of seeds, especially flour of corn, rice, wheat, rye, barley, oats, millet, soybean or other grain legumes, bran, cereal sprouts, milk powder, whey, animal glue and the like. The effect of these protein containing natural, animal or vegetable products and processed products thereof depends upon the nature of the protein. The best effect is obtained with protein having a high content of alkali-soluble protein substances. Moreover, the proportion of protein in natural products of animal and vegetable origin or processed products thereof is significant. Whey can be used in its natural form or after enrichment of the protein. Soybean protein or proteins of other grain legumes can be used in milled form or as a soluble-disperse product or precipitate. Cereal and grain legume flour is effective and easy to use for the purpose of the present invention, provided that the protein has not been removed or excessively denatured. Cross-linked protein products, such as horn or hair cross-linked by means of sulfur bridges, are not soluble in alkali and are therefore not effective.

Protein products are known to form a stable, closed-pore "beaten foam" when air or other gases are stirred in. In the process of the present invention, however, their effect is completely different, namely in that they interrupt the wall formation of inorganic foam to form open pores. After the production of the foam, the proteins used as "pore-openers" can be removed by solubilizing, rinsing or by thermal decomposition. It is also possible to remove the accompanying, insoluble and ineffective components, for example the starch contained in flour, by means of chemical decomposition. The chemical resistance of the thin-walled foam against acids can be increased by conventional heat treatment. The addition of fibrous materials for the purpose of reinforcement is also possible.

Surprisingly, it is thus possible to achieve any desired degree of permeability in a previously completely closed-pore foam by adding the protein-containing products, even a completely open-pore foam through which water can trickle or flow.

The amount of added pore opener depends significantly upon the protein content and the proportion of starch in flour. For example, when a flour is used, the addition of 75 g of cereal flour per 10,000 g of molding composition results in a substantially closed-pore foam with a low permeability, whereas depending upon the protein content, the addition of 125 to 500 g of flour results in an open-pore foam. With pore openers having a high content of alkali-soluble protein, for example egg white, concentrated whey, milk protein, gelatin and casein, the amount to be added is smaller and ranges between 30 and 200 g pore opener per 10,000 g of processable molding composition.

Accordingly, the amount of additive is small in relation to its effect as a pore opener. In the case of flour, large amounts of additive exceeding 600 g per 10,000 g molding composition are not advantageous, since the effect of the protein is sufficient in any case, and starch might have to be removed from the finished product by washing.

The protein content in cereal or grain legume flour varies greatly and may range between 1 and 18 wt.-%, for example.

In general, therefore, the pore openers are already effective when 20 to 200 g protein preferably 60 to 150 g of protein per 10,000 g of finished molding composition are added by means thereof.

The foaming agents and the amounts thereof to be used are known from the prior art. Examples are, on the one hand, more or less large amounts of peroxides, preferably hydrogen peroxide in aqueous solution, sodium perborate and, optionally, further peroxides or substances which release oxygen when they decompose. On the other hand, it is also possible to add comparatively small amounts of metal powder, especially aluminum, which can be decomposed by an alkali.

If a solid substance is used as the foaming agent, especially powdered aluminum, it is added to the reactive solid substance in the dry state. However, if hydrogen peroxide is used as the foaming agent, it is added as the last component.

The following examples illustrate the present invention and will enable others skilled in the art to understand it more completely. It should be understood, however, that the invention is not limited solely to the particular examples given below.

COMPARATIVE EXAMPLE A 4200 g of an alkaline silicate solution which contained 52 wt.-% water as well as silicate and alkali in a mol ratio of 1.5 $SiO_2$ per mol of alkali oxide ($Na_2O$ and $K_2O$ in equal molar amounts), were admixed by stirring with 3360 g of a furnace filter dust from an electrocorundum manufacturing plant in the form of an oxide mixture containing amorphous $SiO_2$ and $Al_2O_3$ and with 740 g mica and 1100 talcum as fillers, to form a uniform suspension.

Upon the addition of 450 g of a 10 wt.-% hydrogen peroxide solution the composition began to foam after a short period of time and hardened exothermically in 30 to 45 minutes to form a foam with closed pores.

EXAMPLE 1

Prior to addition of the foaming agent, the foam composition of Comparative Example A was admixed with a. 150 g of various cereal flours, namely wheat flour types 405, 550, 801 and 1050, rye flour types 997, 1150 and 1370, corn flour or rice flour. Open-pored foam bodies with a bulk density between 250 and 300 kg/m³ were obtained.

b. The foam composition was admixed with the cereal flours mentioned in a., but in amounts of 250 g prior to the addition of the foaming agent. Open-pored foam bodies with a bulk density of 340 to 380 kg/m³ were obtained.

All of the foam bodies consisted of an open-pored foam which contained connecting channels between all bubbles and was air and water permeable.

EXAMPLE 2

The suspension of Comparative Example A was admixed with 500 g of wheat flour, and after addition of 480 g of sodium perborate as a foaming agent an open-pored hardened foam with a density of 500 kg/m³ was obtained.

EXAMPLE 3

The suspension of Comparative Example A was admixed with 500 g of rice flour and was then hardened with 14 g of aluminum powder as a foaming agent into an open-pored foam having a density of 470 kg/m³.

EXAMPLE 4

4200 g of the alkali metal silicate solution described in Comparative Example A were admixed with 2100 g metakaolin, 340 g mica and 550 g talcum as well as 500 g rye flour, and then 500 g of sodium perborate were added as a foaming agent. After increase of the temperature to 50° C. the composition hardened into an open-pored foam having a bulk density of 380 kg/m³.

EXAMPLE 5

Comparative Example A was repeated with the amounts of alkali metal silicate suspension, reactive solid substance and fillers given therein, and 500 g of an protein containing substance were added as a pore opener and thereafter a 10 wt.-% hydrogen peroxide solution was added in the amounts given below. In each case an open-pored foam with the following bulk densities which depended upon the amount of hydrogen peroxide solution was obtained:

a. When rice flour or corn flour was used as the pore opener and 200 g of hydrogen peroxide solution were used, a foam having a bulk density of 600 kg/m³ was formed.
b. When casein or milled gelatin and 600 g of the above mentioned hydrogen peroxide solution were used, an open-pored foam having a bulk density of 520 kg/m³ was obtained.

EXAMPLE 6

4200 g of the alkali metal silicate solution of Comparative Example A, combined with 4050 g of electrofilter ash from a brown coal power plant and 150 g of calcined bauxite as reactive solid substances and with 740 g mica and 1100 g talcum as fillers, were admixed with
a. 200 g or
b. 500 g
of wheat flour with an additional 10% of soybean flour. 400 g, 500 g and 600 g, respectively, of a 10 wt.-% hydrogen peroxide solution were added to the mixture in different runs. Open-pore foams having a bulk density in the range of 100 to 600 kg/m³ were obtained which hardened with an exothermic reaction. Increasing amounts of flour increased the bulk density, and increasing amounts of hydrogen peroxide solution decreased the bulk density.

EXAMPLE 7

The addition of 75 g of the flour mentioned in Example 6 and the use of the molding composition referred therein produced a largely closed-pore foam which had only a low permeability to air due to open pores. Without the addition of the protein containing flour, a foam with only closed pores was obtained.

EXAMPLE 8

5.46 kg of Portland cement were intimately admixed with 270 g of wheat flour type 405. Thereafter, by the addition of 3.94 kg of an alkali metal silicate solution corresponding to that used in Example 1, a suspension was produced which was foamed with 330 g of 10 wt.-% hydrogen peroxide. An open-pored foam product was obtained.

COMPARATIVE EXAMPLE 9

A foam composition was prepared as in Example 8, but the addition of wheat flour was omitted. The foam product produced thereby was closed-pored.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A composition for the manufacture of a solid open-pore foam product, said composition comprising an inorganic, stone-forming component, a water-containing curing agent which initiates the hardening reaction of the stone-forming component in the alkaline range, a foaming agent, and an at least partly alkali-soluble protein or a degradation product thereof in an amount sufficient to form an open-pore foam product.

2. A composition for the manufacture of a solid open-pore foam product, said composition comprising an inorganic, stone-forming component, an alkali metal silicate solution containing 1.2 to 2.5 mols of $SiO_2$ per mol of $K_2O$ and/or $Na_2O$ as a curing agent, a foaming agent, and an at least partly alkali-soluble protein or a degradation product thereof.

3. A composition for the manufacture of a solid open-pore foam product, said composition comprising an inorganic, stone-forming component containing one or more reactive solid substances selected from the group consisting of
   a) a finely dispersed oxide mixture containing amorphous silicon dioxide and aluminum oxide,
   b) vitreous, amorphous electrofilter ash,
   c) milled calcined bauxite,
   d) electrofilter ash from a brown coal power station,
   e) undissolved amorphous $SiO_2$ obtained from amorphous disperse powder-like dehydrated or water-containing silicic acid or from high-temperature processes,
   f) metakaolin, and
   g) cement, an alkali metal silicate solution containing 1.2 to 2.5 mols of $siO_2$ per mol of $K_2O$ and/or $Na_2O$ as a curing agent, a foaming agent, and an at least partly alkali-soluble protein or a degradation product thereof.

4. The method of preparing an open-pore solid foam product, which comprises adding an at least partly alkali-soluble protein or a degradation product thereof in an amount sufficient to form open pores to a molding composition containing an inorganic stone-forming component, a water-containing curing agent which initiates the hardening reaction of the stone-forming component in the alkaline range, and a foaming agent.

5. The method of claim 4, wherein 20 to 600 g of protein or degradation product thereof are added per 10,000 g of molding composition.

6. A composition of claim 1, which further comprises 5 to 100 parts by weight fillers per 100 parts by weight of stone-forming component.

7. A composition of claim 2, which contains 0.4 to 4.0 parts by weight of stone-forming component per part by weight of alkali metal silicate solution.

* * * * *